(12) United States Patent
Houston et al.

(10) Patent No.: US 9,647,558 B2
(45) Date of Patent: May 9, 2017

(54) SYSTEM AND METHOD FOR MAINTAINING A CONSTANT OUTPUT VOLTAGE RIPPLE IN A BUCK CONVERTER IN DISCONTINUOUS CONDUCTION MODE

(71) Applicant: Intersil Americas, LLC, Milpitas, CA (US)

(72) Inventors: Michael Jason Houston, Cary, NC (US); Steven Patrick Laur, Raleigh, NC (US)

(73) Assignee: INTERSIL AMERICAS LLC, Milpitas, CA (US)

( * ) Notice: Subject to any disclaimer, the term of this patent is extended or adjusted under 35 U.S.C. 154(b) by 226 days.

(21) Appl. No.: 14/312,678

(22) Filed: Jun. 23, 2014

(65) Prior Publication Data
US 2015/0318786 A1 Nov. 5, 2015

Related U.S. Application Data

(60) Provisional application No. 61/987,500, filed on May 2, 2014.

(51) Int. Cl.
*H02M 3/158* (2006.01)
*H02M 1/15* (2006.01)

(52) U.S. Cl.
CPC .......... *H02M 3/1588* (2013.01); *H02M 1/15* (2013.01); *H02M 3/158* (2013.01); *Y02B 70/1466* (2013.01)

(58) Field of Classification Search
CPC .... H02M 3/158; H02M 3/1582; H02M 3/137; H02M 3/139; H02M 3/142; H02M 3/156; H02M 3/157; H02M 2003/1566; G05F 1/10; G05F 1/24; G05F 1/46; G05F 1/462; G05F 1/467; G05F 1/468
USPC ................................. 323/234, 265, 268, 271
See application file for complete search history.

(56) References Cited

U.S. PATENT DOCUMENTS

| | | | | |
|---|---|---|---|---|
| 5,592,128 A | * | 1/1997 | Hwang | ................... G05F 1/613 323/288 |
| 6,844,710 B2 | * | 1/2005 | Lipcsei | ................. H02M 1/088 323/284 |
| 7,755,342 B2 | * | 7/2010 | Chen | ..................... H02M 3/156 323/271 |

(Continued)

*Primary Examiner* — Jessica Han
*Assistant Examiner* — David A. Singh
(74) *Attorney, Agent, or Firm* — Foley & Lardner LLP; Mark J. Danielson

(57) ABSTRACT

The system and method creates a substantially constant output voltage ripple in a buck converter in discontinuous conduction mode by varying the on-time of a pulse width modulator (PWM) signal driving the buck converter when the buck converter is operating in discontinuous conduction mode. A first signal is generated that is a function of the switching frequency of the buck converter. This signal is low-pass filtered and compared with a second signal that is a function of the switching frequency of the buck converter when operating in continuous conduction mode and with constant PWM on-time. The output signal generated by the comparator is a signal that is equal to the ratio of the first signal and the second signal. The on-time of a voltage controlled oscillator is controlled by the output signal, the oscillator signal causing the on-time of the PWM signal to vary in a controlled fashion.

14 Claims, 15 Drawing Sheets

(56) References Cited

U.S. PATENT DOCUMENTS

| | | | | |
|---|---|---|---|---|
| 7,898,237 B2* | 3/2011 | Shao | H02M 1/4225 | 323/207 |
| 2005/0008108 A1* | 1/2005 | Peng | H04L 27/0014 | 375/344 |
| 2006/0268974 A1* | 11/2006 | Chu | H02M 3/156 | 375/238 |
| 2008/0284398 A1* | 11/2008 | Qiu | H02M 3/156 | 323/283 |
| 2009/0140708 A1* | 6/2009 | Tateishi | H02M 3/1588 | 323/282 |
| 2009/0243580 A1* | 10/2009 | Chen | H02M 3/156 | 323/288 |
| 2009/0309567 A1* | 12/2009 | Morroni | H02M 3/157 | 323/283 |
| 2010/0007318 A1* | 1/2010 | Faerber | H02M 3/156 | 323/283 |
| 2010/0066275 A1* | 3/2010 | Giebel | G06K 7/10643 | 318/128 |
| 2010/0079124 A1* | 4/2010 | Melanson | H02M 3/156 | 323/283 |
| 2010/0231272 A1* | 9/2010 | Chen | H03K 4/50 | 327/140 |
| 2011/0057637 A1* | 3/2011 | Liu | H02M 3/156 | 323/287 |
| 2011/0273157 A1* | 11/2011 | Abu-Qahouq | H02M 3/156 | 323/299 |
| 2012/0019225 A1* | 1/2012 | Tsai | H02M 3/156 | 323/284 |
| 2012/0081094 A1* | 4/2012 | Luo | H02M 3/156 | 323/284 |
| 2012/0194162 A1* | 8/2012 | Lin | H02M 1/14 | 323/304 |
| 2012/0212204 A1* | 8/2012 | Philbrick | H02M 3/156 | 323/284 |
| 2013/0033248 A1* | 2/2013 | Granger | H02M 3/1588 | 323/288 |
| 2014/0292288 A1* | 10/2014 | Yan | H02M 3/156 | 323/234 |
| 2015/0263609 A1* | 9/2015 | Weida | H02M 3/04 | 323/234 |
| 2016/0301304 A1* | 10/2016 | Zarkhin | H02M 3/156 | |

* cited by examiner

SYSTEM AND METHOD FOR MAINTAINING A CONSTANT OUTPUT VOLTAGE RIPPLE IN A BUCK CONVERTER IN DISCONTINUOUS CONDUCTION MODE

CLAIM OF PRIORITY

This application claims priority to U.S. Provisional Patent Application Ser. No. 61/987,500, filed on May 2, 2014, the entirety of which is incorporated herein by reference.

BRIEF DESCRIPTION OF THE DRAWINGS

The features, advantages, and benefits of the present invention will become more apparent from the following description taken in conjunction with the accompanying drawings, which are presented solely for exemplary purposes and not with the intent to limit the invention thereto, and in which.

DETAILED DESCRIPTION OF THE INVENTION

The following description is presented to enable one of ordinary skill in the art to make and use the present invention as provided within the context of a particular application and its requirements. Various modifications to the embodiments described will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
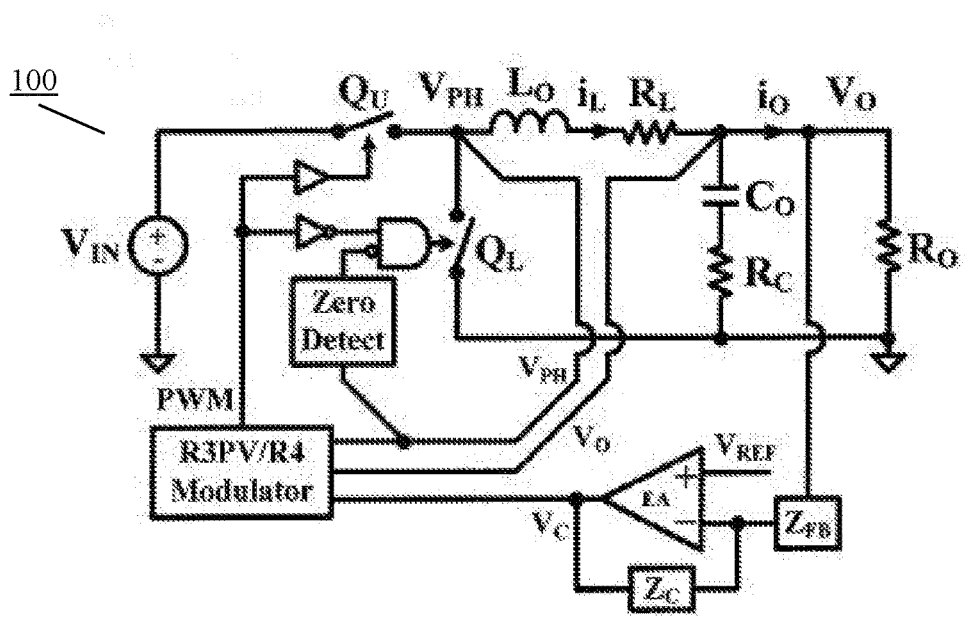
FIG. 1 is a simplified block diagram of a buck converter 100 according to an embodiment of the invention.

FIG. 1 is a simplified block diagram of a buck converter 100. A pulse width modulator (PWM), shown at R3PV/R4, provides the PWM drive signals to drive two synchronous power switches, a high-side FET, shown at QU, and a low-side FET, shown at QL. Note that QL is turned off by a zero detect circuit when the inductor current reaches zero amperes to prevent pulling charge from the output capacitor Co to ground.

Buck converter 100 operates with synchronous switches QU and QL to improve efficiency in the converter's continuous conduction mode (CCM). To improve light load efficiency, converter 100 employs diode emulation to achieve discontinuous conduction mode (DCM) operation. Buck converter 100 operates in continuous conduction mode if the current iL through the inductor Lo never falls to zero during the commutation period T. The frequency of operation Fs of buck converter 100 is the inverse of the commutation period T. Buck converter 100 operates in discontinuous conduction mode when the amount of energy required by the load is too small to maintain CCM operation. In this mode, the current through inductor Lo falls to zero during part of the commutation period. The boundary between the discontinuous and continuous conduction modes is reached when the inductor current iL falls to zero exactly at the end of the commutation period. This boundary is a function of switching frequency and converter components, and occurs when the load current is equal to a particular value hereinafter called the critical load current, Icrit.

Figure 2:
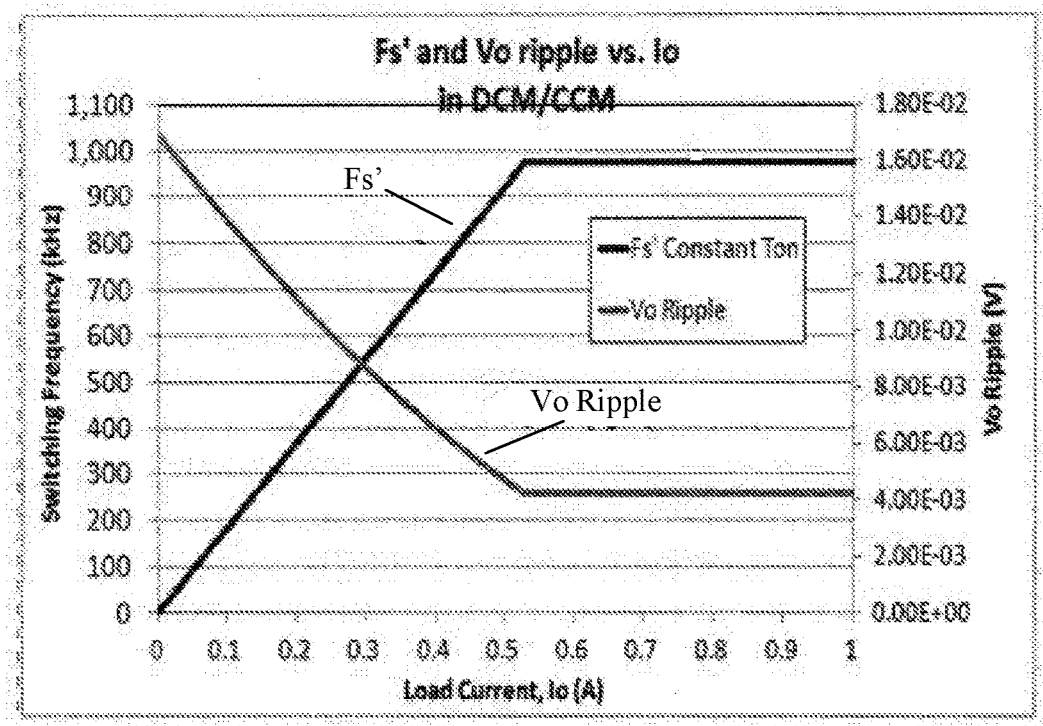
FIG. 2 is a chart showing switching frequency and output voltage ripple in the buck converter of FIG. 1 where ton is kept constant in discontinuous conduction mode.

Constant on-time controllers are commonly used in buck converters due to their ease of implementation and natural DCM/CCM behavior. In prior art buck converters where the converter on-time, $t_{on}$, remains constant at all load current values, DCM operation creates larger output voltage ripple compared to CCM operation. FIG. 2 is a chart showing switching frequency (Fs') and output voltage ripple (Vo ripple) in the buck converter of FIG. 1 where $t_{on}$ is kept constant during DCM operation. As seen in FIG. 2, above the boundary between CCM and DCM operation, both the switching frequency Fs and the output voltage ripple are constant values. However, as the output current Io drops below the boundary between CCM and DCM operation, output voltage ripple goes up, reaching a maximum at zero load current while the switching frequency Fs' decreases linearly as a function of the decreasing load current. Most users of buck converters desire to have similar ripple values during CCM and DCM operation, which is difficult to achieve with prior art constant on-time buck converters.

Figure 3:
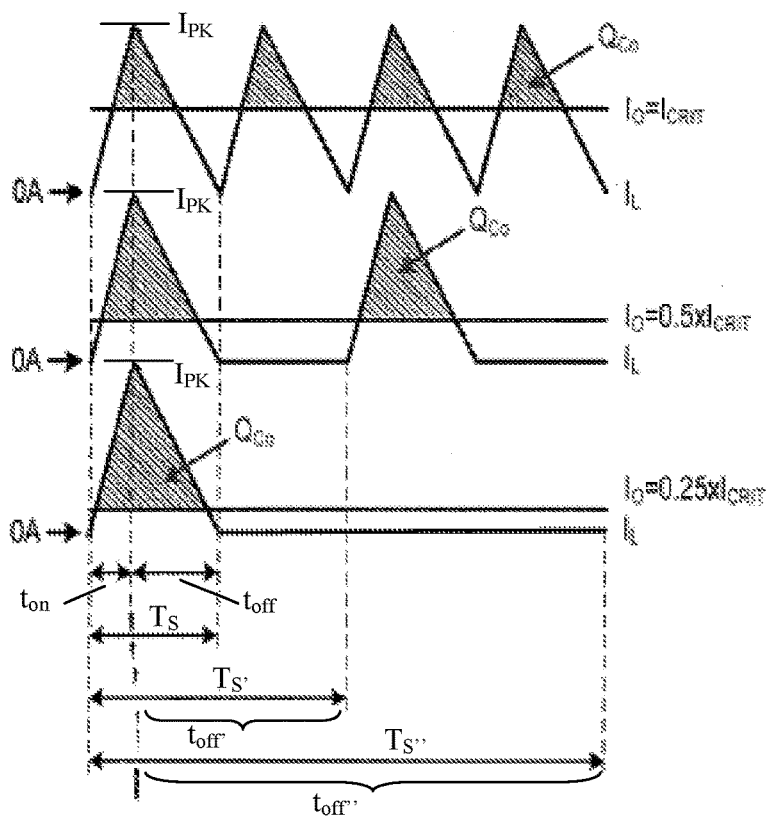
FIG. 3 is a timing diagram illustrating the variation in net charge delivered to the output capacitor of the buck converter of FIG. 1 as the output current drops below the converter's critical current at the boundary between continuous conduction mode operation and discontinuous conduction mode operation.

For controllers that maintain a constant $t_{on}$ of the high-side FET, the reason that output voltage ripple goes up in DCM operation is that the amount of net charge delivered to the output capacitor Co increases as the output load resistance Ro increases, thereby decreasing load current. FIG. 3 is a timing diagram illustrating the variation in net charge delivered to the output capacitor Co of the buck converter 100 of FIG. 1 as the output current drops below the converter's critical output current at the boundary between CCM and DCM operation. In FIG. 3, the top timing diagram shows the charge delivered to the output capacitor of buck converter 100 at the boundary point between CCM and DCM operation where Io is equal to Icrit. Note that Ipk remains constant during DCM operation. The second timing diagram shows the charge delivered to the output capacitor where Io is equal to one half of Icrit. As can be seen, the frequency Fs' has fallen by half at this point (i.e., the commutation period Ts' is twice Ts). The third timing diagram shows the charge delivered to the output capacitor where Io is equal to one quarter of Icrit. As can be seen, the frequency Fs' has fallen to one fourth of Fs at this point (i.e., when Ts" is four times Ts). Note that, as the frequency decreases linearly with load, i.e., the commutation period Ts, the sum of $t_{on}$ and $t_{off}$, goes up, while the net charge Qco coupled to the output capacitor Co goes up, seen as the grey area under the curve. Since $t_{on}$ remains constant during DCM operation, $t_{off}$ goes up as a function of falling load current.

Figure 4:
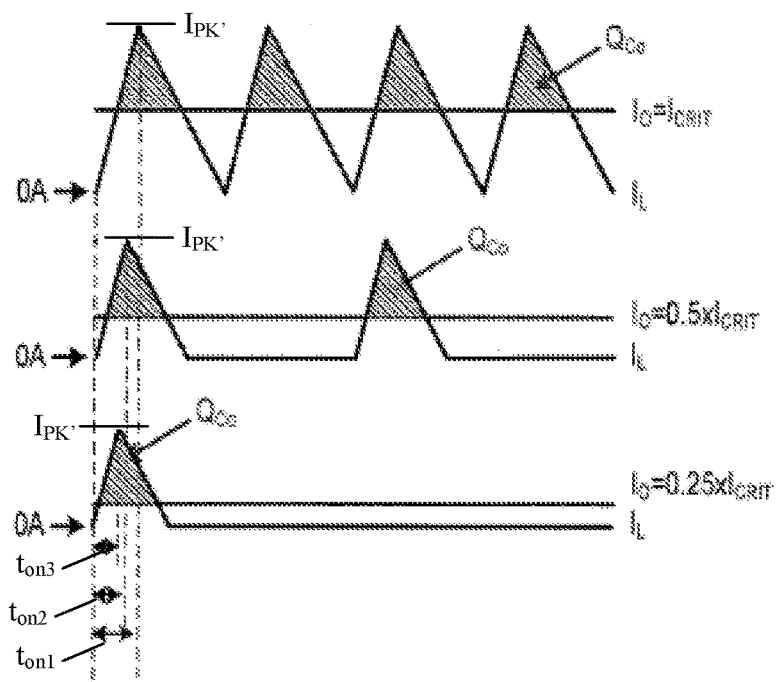
FIG. 4 is a timing diagram illustrating the net charge delivered to the output capacitor of the buck converter of FIG. 1 where $t_{on}$ is varied as a function of load current according to one embodiment of the present invention.

FIG. 4 is a timing diagram illustrating the net charge delivered to the output capacitor Co of the buck converter of FIG. 1, where $t_{on}$ is varied as a function of load current according to one embodiment of the present invention. As seen in FIG. 4, the same exemplary output current values as used in FIG. 3 are used. In this illustration of an embodiment of the invention, $t_{on}$ is varied during DCM operation in order to maintain the net charge delivered to the buck converter's output capacitor Co at a constant level, or at a close approximation to such a value, in order to maintain a constant output voltage ripple independent of the value of Io. As seen in FIG. 4, when Io is equal to Icrit, the value of $t_{on}'$ is Ton1. When Io is equal to one half of Icrit, $t_{on}'$ is smaller, as seen at Ton2, and when Io is equal to one quarter of Icrit, $t_{on}'$ is smaller still, as seen at Ton3. The relevant equations are as follows:
For constant on system, DCM switching frequency is:

$$F_S = \frac{2I_O V_O}{I_{PK} V_{IN} t_{ON}}$$

and the charge delivered to the output capacitors $$Q_{Co} = \frac{1}{2}\frac{(I_{PK}-I_O)^2}{I_{PK}}\frac{t_{ON}}{D}$$

at the critical inductor current the charge delivered to the output capacitors is:

$$Q_{Co} = \frac{1}{2}\frac{(I_{PK}-0.5I_{PK})^2}{I_{PK}}\frac{V_{IN}}{V_O}t_{ON} = \frac{1}{8}I_{PK}T_S$$

To keep the charge into the capacitor constant as the load decreases $t_{ON}$ must be adjusted based on the load. Find $t_{ON}'$:

$$t_{ON}' = \frac{1}{8}I_{PK}'T_S \cdot 2\frac{I_{PK}'}{(I_{PK}'-I_O)^2}D = \frac{1}{8}I_{PK}'T_S \cdot 2\frac{I_{PK}'}{\left(\frac{1}{2}I_{PK}'\right)^2}D = t_{ON}\left(\frac{1}{2}+\frac{I_O}{I_{PK}}\right)$$

since $$I_{PK}' = I_O + \frac{1}{2}I_{PK}$$

The desired behavior for $t_{on}'$ is therefore $$t_{on}' = t_{on}(\frac{1}{2}+I_o/I_{pk}) \qquad \text{[Equation 1]}$$

The ideal behavior of $t_{on}'$ is therefore equal to $t_{on}$ times one half plus the ratio of Io to Ipk, the peak inductor current. As seen from the above equations, switching frequency Fs is linearly related to the output load current, Io. Ipk and Ipk' are shown in FIG. 4 as the peak current through inductor Lo, and the duty cycle D of the converter is equal to Vo/Vin. Qco is the charge coupled to the output capacitor and is shown as the area under the inductor current curve in FIG. 4. As seen from the above equations, as Io goes to zero current, the variable on-time $t_{on}'$ goes to a duration of one half of $t_{on}$.

Figure 5:
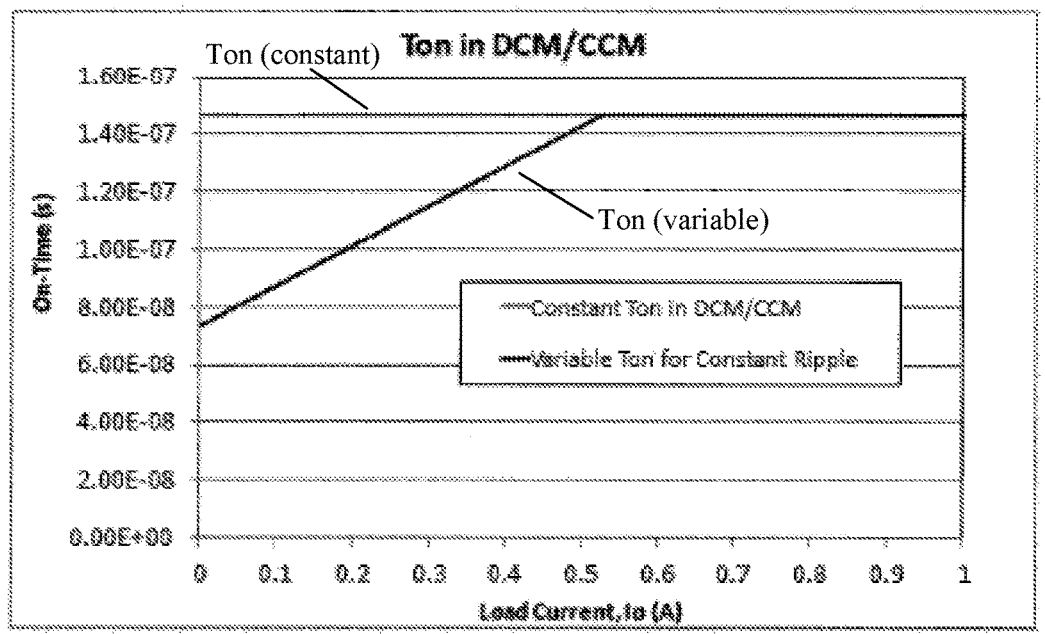
FIG. 5 is a graph showing the variation of $t_{on}$ as a function of load current during discontinuous and continuous conduction modes according to one embodiment of the present invention.

FIG. 5 is a graph showing the variation of $t_{on}$ as a function of load current during discontinuous and continuous conduction modes according to one embodiment of the present invention. As seen in FIG. 5, to produce a constant output voltage ripple during DCM operation, $t_{on}$ is caused to decrease linearly as load current decreases. At zero load current, $t_{on}$ has decreased to a value that is equal to one half of its normal on-time.

Since it is difficult to measure the output load current Io, in a first embodiment according to the present invention, an approximation is used which avoids having to measure Io in order to generate the variable $t_{on}'$ needed to cause a level of charge to be delivered to the output capacitor Co during each commutation period that is close to a constant value. In this embodiment, the change in output current can be approximated by generating a signal that is a function of the change in switching frequency Fs' that occurs in buck converter 100 as a function of the change in load current. The equations used to approximate the desired behavior of $t_{on}'$, as indicated in the above equation, are as follows:
using a measurement of the switching period to adjust the $t_{ON}$ can get pretty close to the desired behavior $$F_S' = \frac{2I_O D}{I_{PK}'t_{ON}'} = \frac{2I_O t_{ON}}{I_{PK}'t_{ON}'T_S} \rightarrow \frac{F_S'}{F_S} = \frac{2I_O t_{ON}}{I_{PK}'t_{ON}'} = \frac{2I_O t_{ON}}{I_{PK}'t_{ON}'}$$

The constant on time control reference can be modified:

$$t'_{ON} = t_{ON}\left(\frac{F'_S}{F_S} + \frac{1}{2}\right)$$

which gives:

$$t'_{ON} = t_{ON}\left(\frac{2I_O}{I_{PK}} \cdot \left(\frac{t_{ON}}{t'_{ON}}\right)^2 + \frac{1}{2}\right)$$

compared to the desired behavior $$t'_{ON} = t_{ON}\left(\frac{I_O}{I_{PK}} + \frac{1}{2}\right)$$

This second equation for generating a varying $t_{on}'$ is referenced below as Equation 2. Note that the equation Ipk'=Ipk×$t_{on}'/t_{on}$ was used to substitute for Ipk' in the Fs'/Fs equation to get $t_{on}'$ in the above resultant equation. In other words, the $t_{on}'$ generated by the equation to times the ratio of Fs'/Fs plus one half is an approximation of the desired $t_{on}'$. Since the ratio of Fs'/Fs includes the values of Io and Ipk' in it, this approximation is pretty close.

Figure 6A:
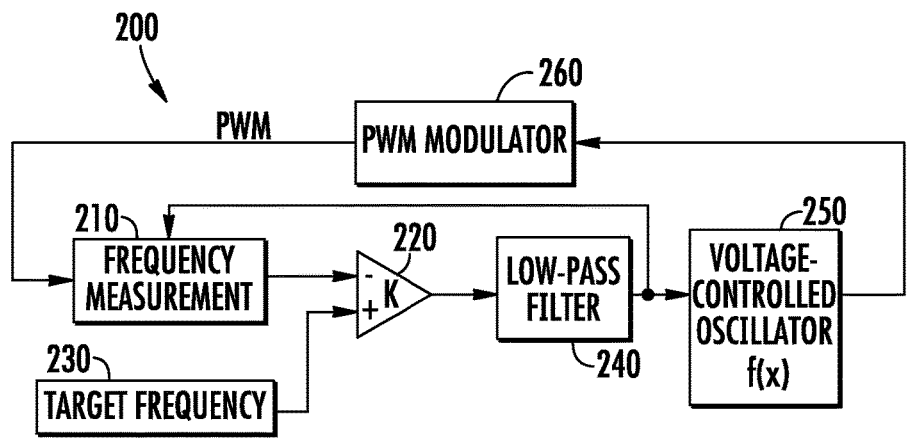
FIGS. 6A and 6B are block diagrams of alternate embodiments of a system for adjusting $t_{on}$ in the buck converter of FIG. 1 according to the present invention.
Figure 6B:
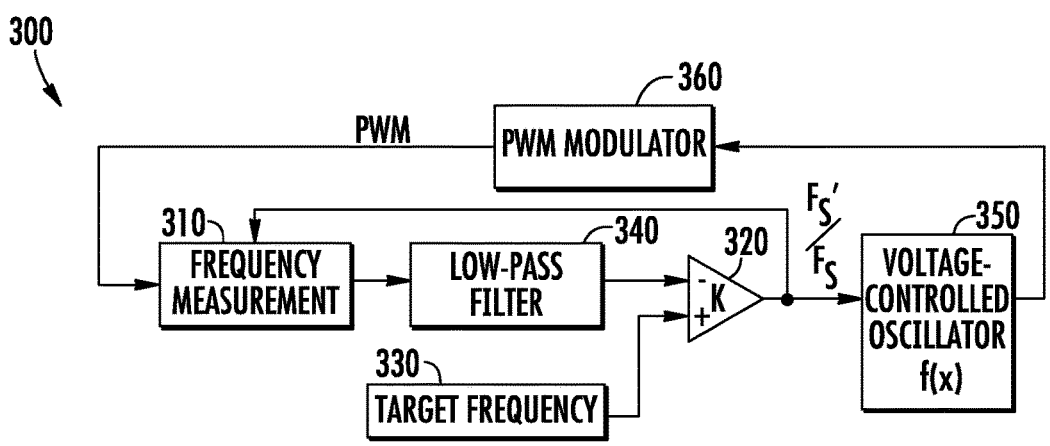

FIGS. 6A and 6B are block diagrams of alternate embodiments of a system for adjusting $t_{on}$ in the buck converter of FIG. 1 according to the present invention. In FIG. 6A, the system 200 includes a first block 210 which measures the DCM frequency Fs'. This value is compared by a comparator/gain stage 220 with a target value representative of frequency Fs generated by block 230. The output of comparator/gain stage 220 is fed through a low-pass filter 240 to a voltage controlled oscillator 250 whose output is coupled to a PWM Modulator 260 for generation of the PWM signal whose on-time is $t_{on}'$. The output of low-pass filter 240 is also fed back to the block 210 to generate a control loop that regulates the signal output by the low-pass filter.

The system 300 shown in block diagram 6B is an alternative embodiment of a system to adjust the on-time $t_{on}'$. System 300 is similar to system 200 but it positions the low-pass filter, shown at 340, before the comparator/gain stage, shown at 320. Again, a value representative of frequency Fs generated by block 330 is also coupled to comparator/gain stage 220. In system 300, the output of comparator/gain stage 320 is fed back to frequency measurement block 310 in addition to being coupled to a voltage controlled oscillator 350 whose output is coupled to a PWM Modulator 360.

Figure 7:
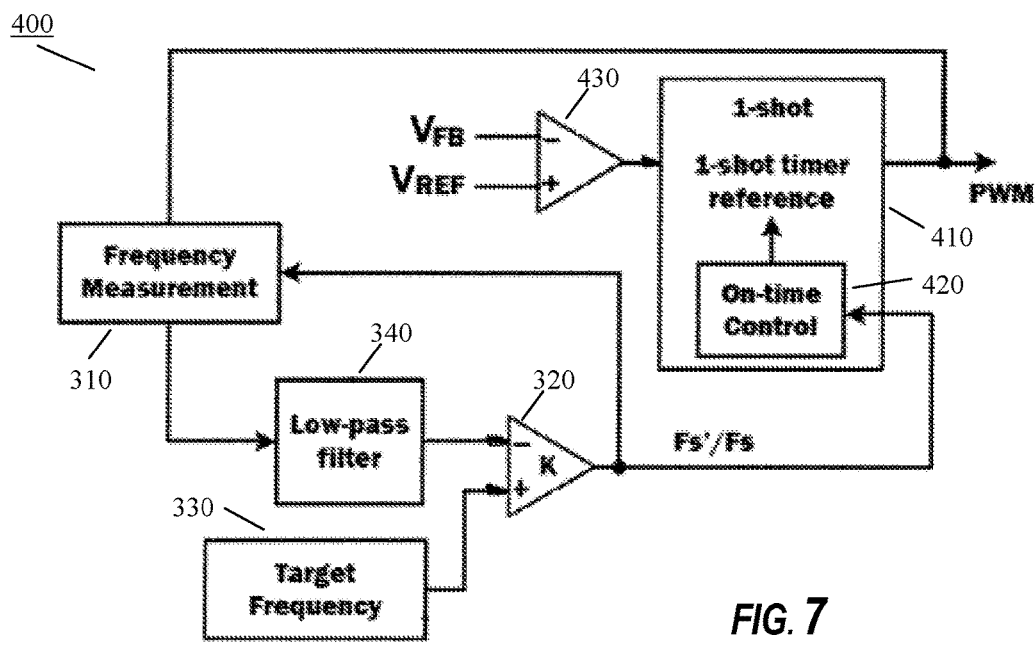
FIG. 7 is a block diagram of another embodiment of a system for adjusting $t_{on}$ n in the buck converter of FIG. 1 according to the present invention.

FIG. 7 is a block diagram of another embodiment of a system for adjusting $t_{on}$ in the buck converter of FIG. 1 according to the present invention. System 400 shown in FIG. 7 includes a one-shot 410 for generating the PWM signal, including $t_{on}'$ and Toff' when in DCM operation. One shot 410 generates a pulse whenever the feedback voltage Vfb is less than a reference voltage Vref, as determined by comparator 430. Vfb is preferably a function of the buck converter 100 output voltage Vout. Included in one-shot 410 is an On-time Control block 420 which functions to turn off the PWM signal generated by one-shot 410 as a function of the ratio Fs'/Fs. Consequently, the on-time $t_{on}'$ of the PWM signal is controlled by this ratio. The ratio Fs'/Fs is generated in the same manner as described with reference to the embodiments shown in FIG. 6.

Figure 8:
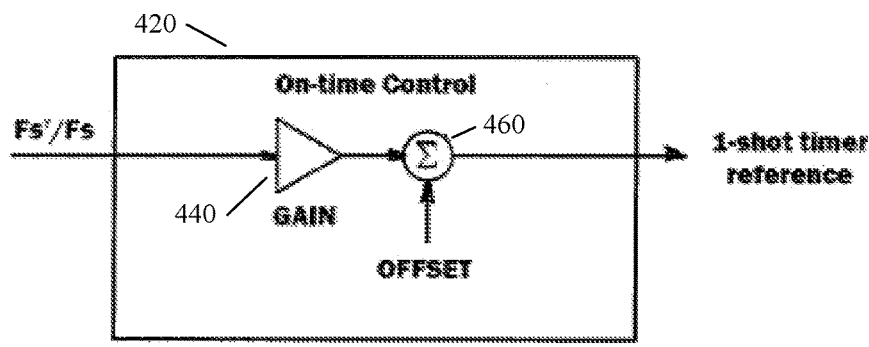
FIG. 8 is a block diagram of an embodiment of the On-time control block shown in FIG. 7.

FIG. 8 is a block diagram of an embodiment of the On-time Control block 420 shown in FIG. 7. As seen in FIG. 8, the On-time Control block preferably includes a gain stage 440 and an offset 460 for enabling the value of Fs'/Fs to be modified to generate a value that is closer to the desired behavior of $t_{on}'$, as described above. In one embodiment, the gain stage provides a gain of 0.5 to counter the 2 in Equation 2 above for $t_{on}'$. Similarly, offset 460 functions to add the scaler "one half" that is also required by Equation 2.

Figure 9:
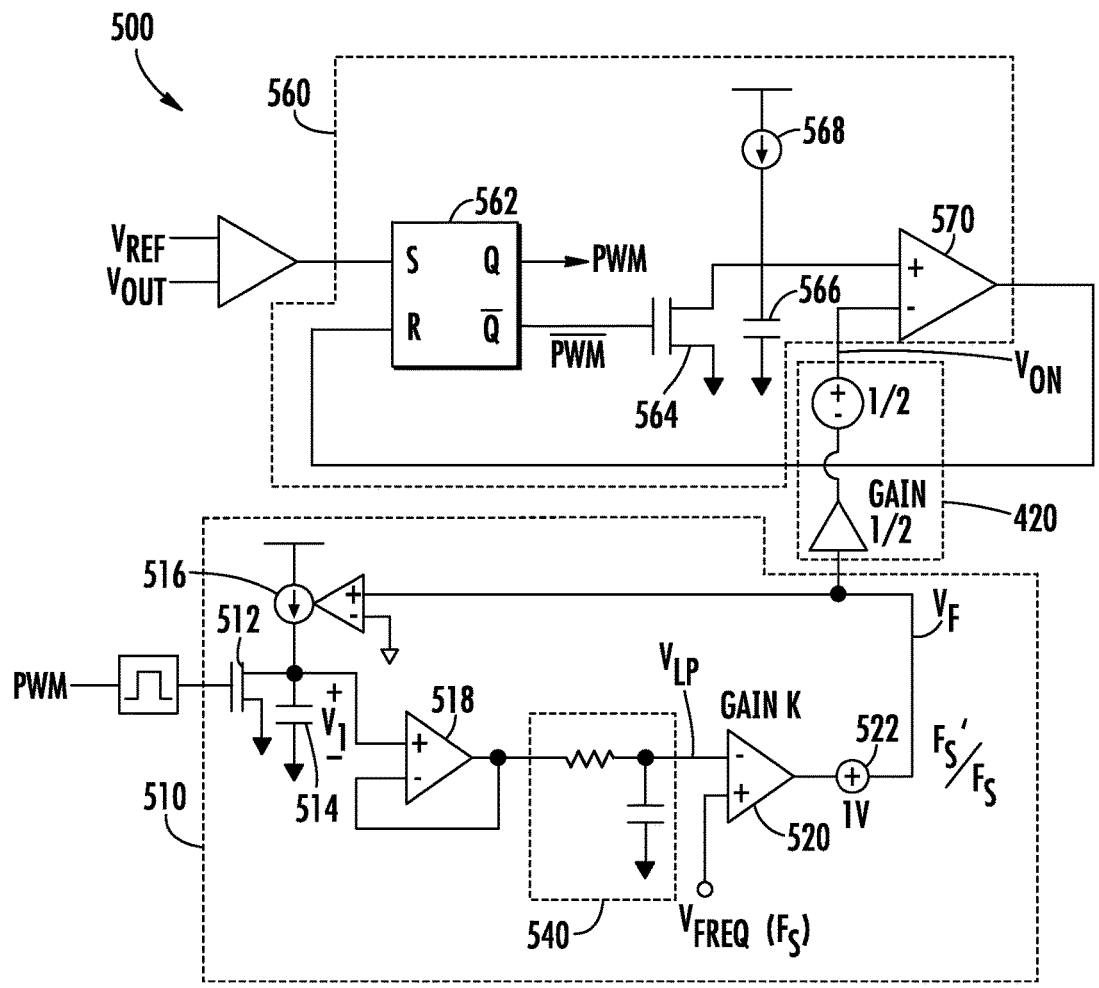
FIG. 9 is a schematic and block diagram of another embodiment of a system for adjusting $t_{on}$ in the buck converter of FIG. 1 according to the present invention.

FIG. 9 is a schematic and block diagram of another embodiment of a system for adjusting $t_{on}$ in the buck converter of FIG. 1 according to the present invention. As seen in FIG. 9, system 500 includes a circuit 510 for generating the Fs'/Fs ratio. In operation, the PWM signal is coupled to circuit 510. The rising edge of each PWM signal turns on a FET switch 512 to discharge capacitor 514. Once switch 512 opens, a current source 516 causes capacitor 514 to begin charging up. The current generated by current source 516 drops as a function of the drop in the frequency Fs' of the buck converter 100, as explained further below. The increasing voltage V1 across capacitor 514 caused by current source 516 is fed through a buffer 518 to a low-pass filter 540. Low-pass filter 540 removes any high frequency components in V1 and helps stabilize the control loop created by the feedback of the Fs'/Fs ratio to current source 516. The output of low-pass filter 540 is a voltage VLP whose amplitude is a function of the average value of the voltage V1 across capacitor 514.

The output of low-pass filter 540 VLP is fed to the negative input of a comparator/gain stage 520. Comparator/gain stage 540 compares VLP to a reference voltage Vfreq that is coupled to the positive input of gain stage 540. Voltage Vfreq has a predetermined constant value that represents the frequency Fs. The output of comparator/gain stage 520 is the ratio of Fs'/Fs. This ratio may be set to vary from a value of one, at the CCM/DCM boundary down to zero when the load current To drops to zero. A scaler value may be added at 522 to the output of comparator/gain stage 520, if needed.

As described above, the Fs'/Fs signal is fed to an On-time Control circuit, e.g., circuit 420 in FIG. 8, and from there to a 1-shot for generating the PWM signal with the desired $t_{on}'$ value. In the embodiment shown in FIG. 9, the one-shot 560 comprises a set-reset flip-flop 562 that is set when Vout of the buck converter drops below a reference voltage Vref. When the flip-flop 562 switches on, the Q bar output of the flip-flop goes low to turn off a switch 564 which had discharged one-shot capacitor 566 to ground. With switch 564 off, a current source 568 creates a voltage ramp across capacitor 566 and this voltage is fed to the positive input of a comparator 570. The output voltage generated by the On-time Control circuit is coupled to the negative input of comparator 570. The output of comparator 570 resets the flip-flop 562 when the modified Von' exceeds Vout. This controls the on time $t_{on}'$ of the PWM.

Figure 10:
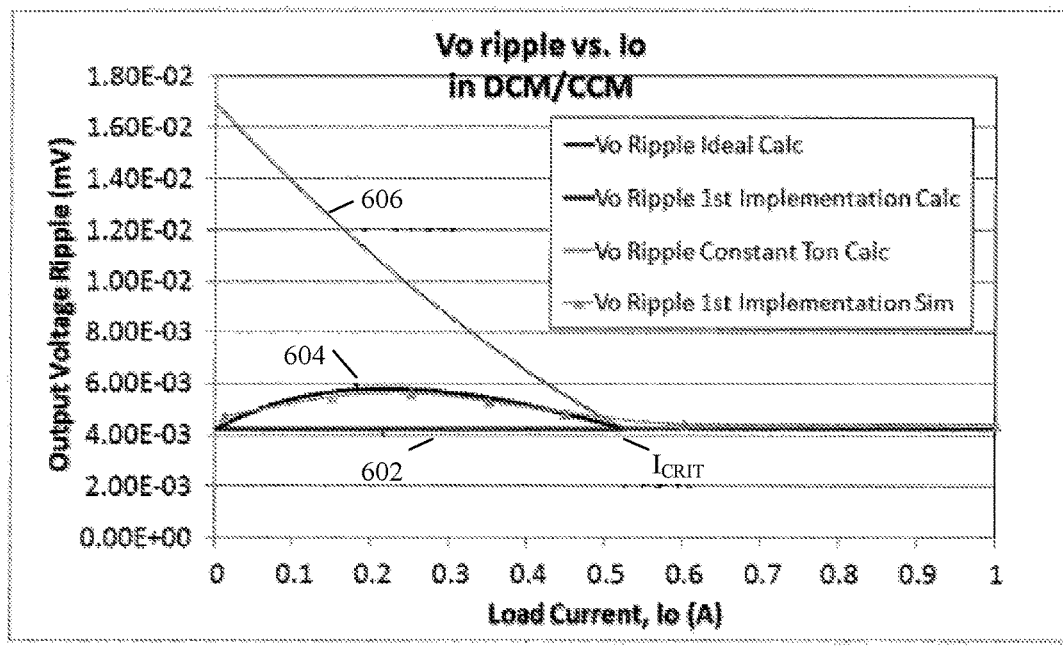
FIG. 10 is a chart showing the variation of $t_{on}$ as a function of load current during discontinuous and continuous conduction modes of the buck converter of FIG. 1 generated by the system shown in FIG. 9.

FIG. 10 is a chart showing the variation of $t_{on}$ as a function of load current during discontinuous and continuous conduction modes of the buck converter of FIG. 1 generated by the system shown in FIG. 9. At 602 is shown the Vout ripple in DCM under ideal conditions where $t_{on}'=t_{on}(I_o/I_{PK}+\frac{1}{2})$. At 604 is shown the Vout ripple generated by the system shown in FIG. 9. At 606 is shown the Vout ripple when $t_{on}$ is not varied during DCM operation according to the embodiment of the present invention shown in FIG. 9.

Figure 11:
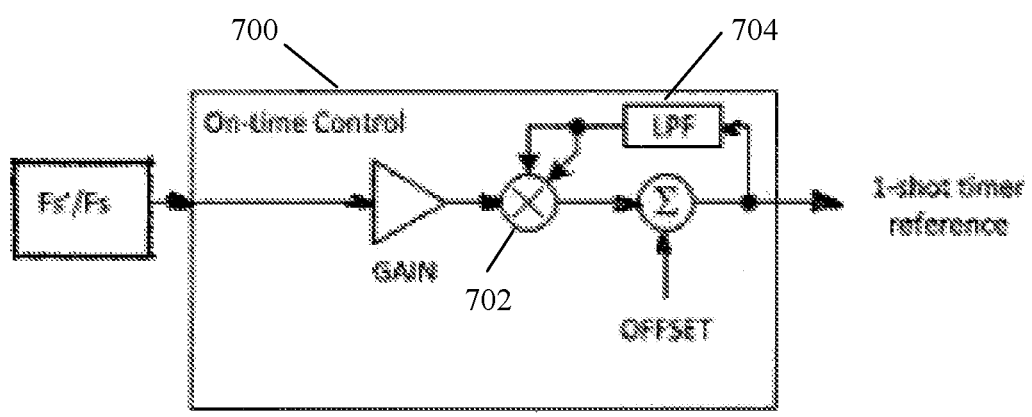
FIG. 11 is a block diagram of another embodiment of an On-time control block according to the present invention.

FIG. 11 is a block diagram of another embodiment 700 of an On-time Control block according to the present invention. In FIG. 11, a multiplier 702 is added along with a second control loop 704 between the generator of Fs'/Fs, as described above, and the 1-shot timer reference, 410. This arrangement yields a $t_{on}'$ function that matches the ideal function described above, $t_{on}'=t_{on}(Io/I_{PK}+\frac{1}{2})$. As is seen, the two inputs to multiplier 702 generate the $t_{on}'^2$ term since $t_{on}=1$ is just needed to cancel out $t_{on}'^2$, and this is the function of the control loop 704. A low pass filter LPF is again used to improve the stability of feedback loop 704.

In an analog circuit, multiplier 702 can be implemented in a conventional way using an analog multiplier such as a Gilbert Cell. If the multiplier 702 is in a digital circuit, one of ordinary skill can readily implement such a functionality using digital processing.

Figure 12:
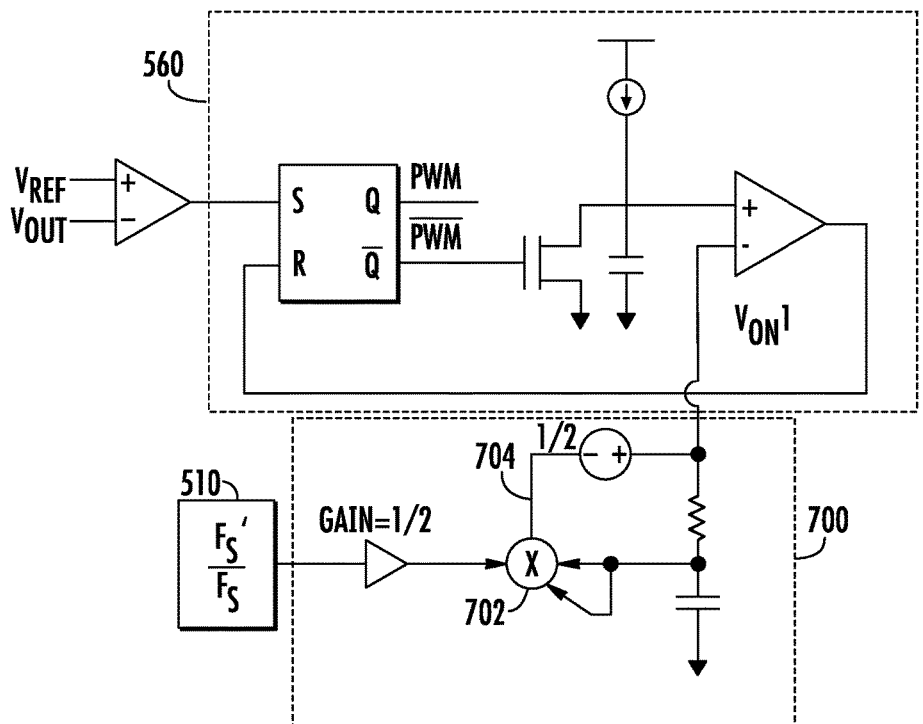
FIG. 12 is a schematic and block diagram of another embodiment of a system for adjusting $t_{on}$ in the buck converter of FIG. 1 according to the present invention showing in more detail the On-time control of FIG. 11.
Figure 13:
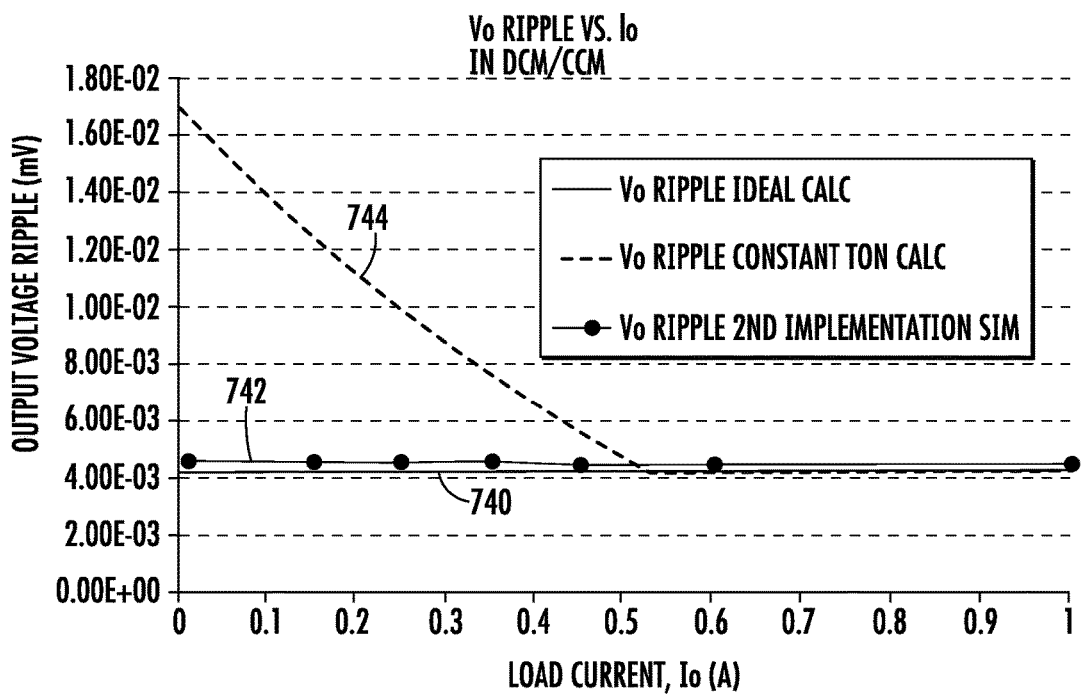
FIG. 13 is a chart showing the variation of $t_{on}$ as a function of load current during discontinuous and continuous conduction modes of the buck converter of FIG. 1 generated by the system shown in FIG. 12.

FIG. 12 is a schematic and block diagram of another embodiment of a system for adjusting $t_{on}$ in the buck converter of FIG. 1 according to the present invention showing in more detail the On-time Control 700 shown in FIG. 11;

FIG. 13 is a chart showing the variation of $t_{on}'$ as a function of load current during discontinuous and continuous conduction modes of the buck converter of FIG. 1 generated by the system shown in FIG. 11. As is seen, the Vout ripple under ideal conditions, shown at 740 is closely matched by the Vout ripple generated by the embodiment of the invention shown in FIG. 12, shown at 742. To some extent, traces 740 and 742 do not match because ideal components are not being used to implement the $t_{on}'$ generator of FIG. 11 in practice. Shown at 744 for comparison purposes is the Vout ripple when $t_{on}$ is not varied during DCM operation.

Figure 14:
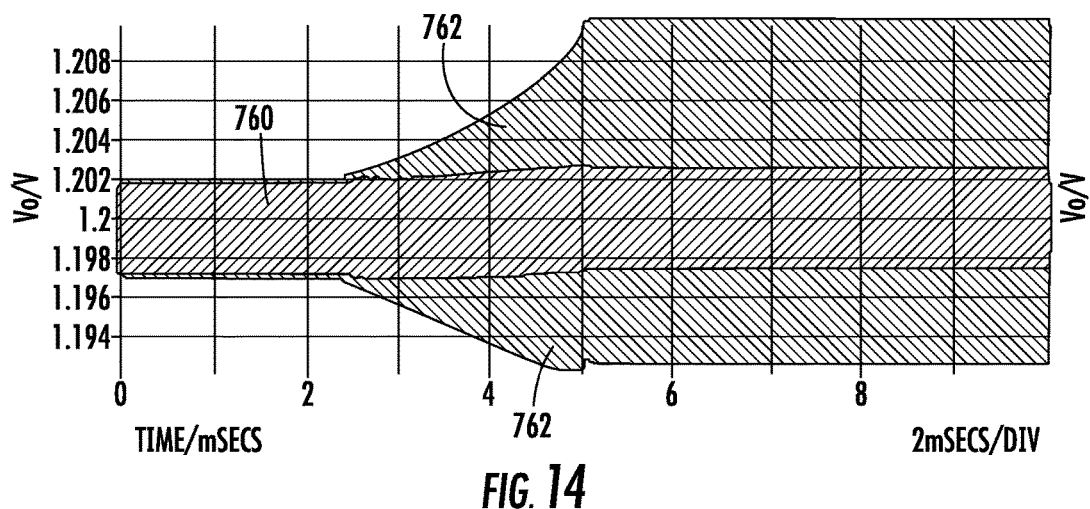
FIG. 14 is a chart showing how the output voltage ripple is maintained constant where $t_{on}$ is varied by the system shown in FIG. 12 versus a system that maintains $t_{on}$ constant in the buck converter's discontinuous conduction mode.

FIG. 14 is a graph showing how the output voltage ripple is maintained constant where $t_{on}$ is maintained constant by the system shown in FIG. 12 versus a system that maintains $t_{on}$ constant in the buck converter's discontinuous conduction mode. FIG. 14 shows a constant output voltage ripple 760 over the load range. At 762 is shown the variation in output voltage ripple with constant $t_{on}$ in DCM. Note that with the circuitry of FIG. 11 in place, the output ripple magnitude can be programmed to other magnitudes.

Figure 15:
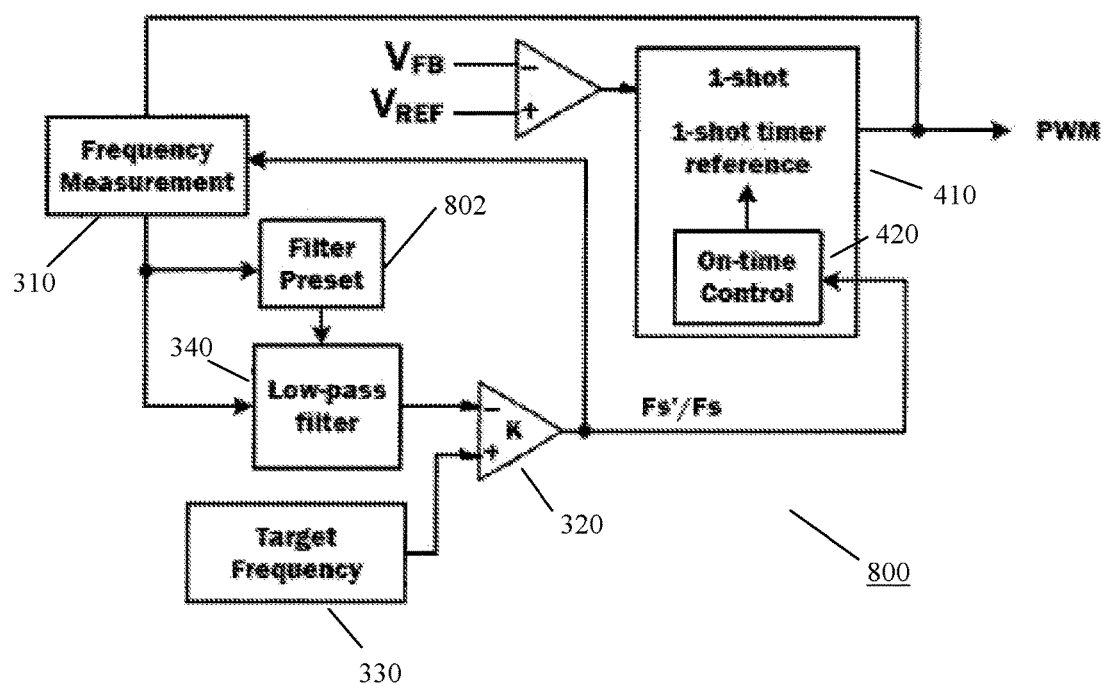
FIG. 15 is a block diagram of another embodiment of a system for adjusting $t_{on}$ in the buck converter of FIG. 1 according to the present invention including an on-time preset for presetting the system when a large signal transient is detected.

FIG. 15 is a block diagram of another embodiment of a system 800 for adjusting $t_{on}$ in the buck converter of FIG. 1 according to the present invention including an on-time preset for presetting the system when a large signal transient is detected. In this embodiment, a filter preset 802 is provided to reset the low-pass filter capacitor if the voltage on the capacitor exceeds some threshold. The filter preset 802 functions to quickly discharge this capacitor, thereby reinitializing the feedback circuit. This is useful if the system goes from a high load to a low load quickly. The normal feedback loop in one embodiment of the invention is not quick enough to adjust to this much of a change in load. The system of FIG. 6B, for example would need several measurements of voltage to create the large change needed in the filter capacitor.

Figure 16:
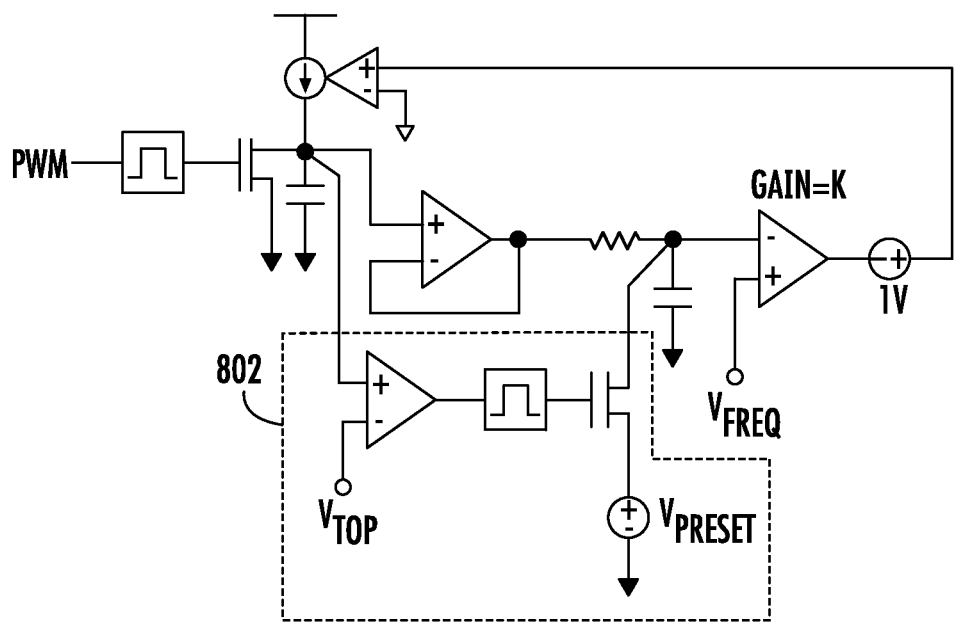
FIG. 16 is a schematic and block diagram of another embodiment of a system for adjusting $t_{on}$ in the buck converter of FIG. 1 according to the present invention including a preset circuit for presetting the system when a large signal transient is detected.
Figure 17:
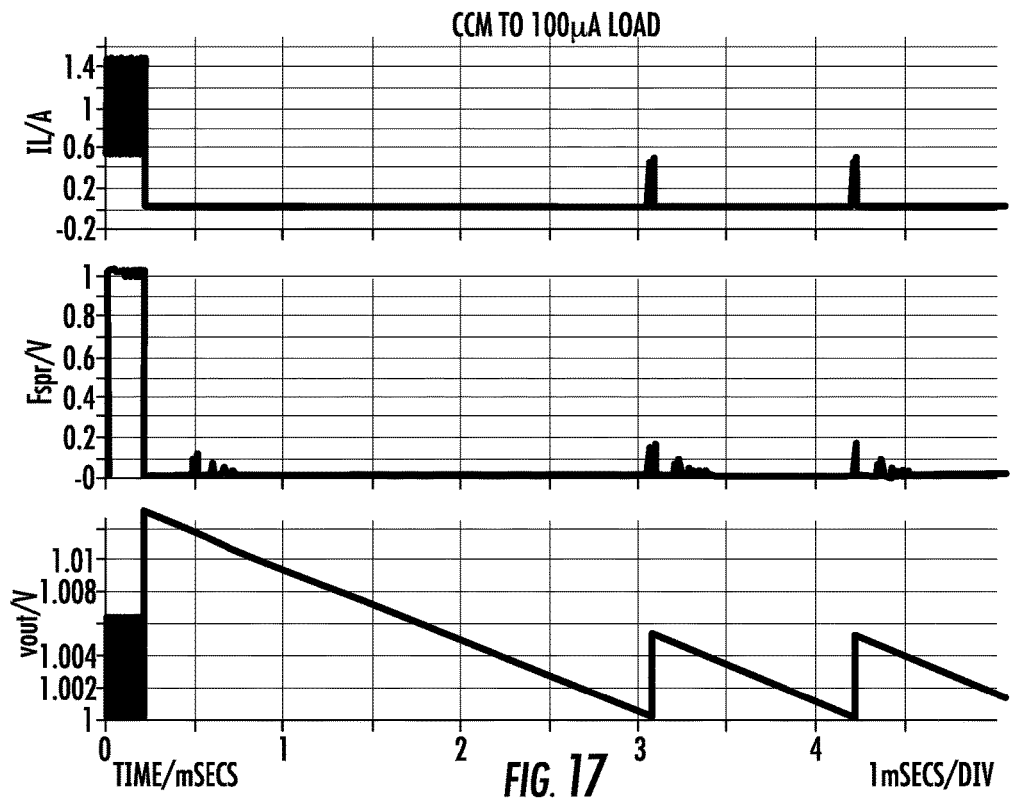
FIGS. 17-20 are timing diagrams showing buck converter output voltage ripple values using the system of FIG. 12 according to the present invention that are generated as the output load current steps down from above the boundary between the continuous conduction mode and the discontinuous conduction mode to various exemplary lower value output load currents.
Figure 18:
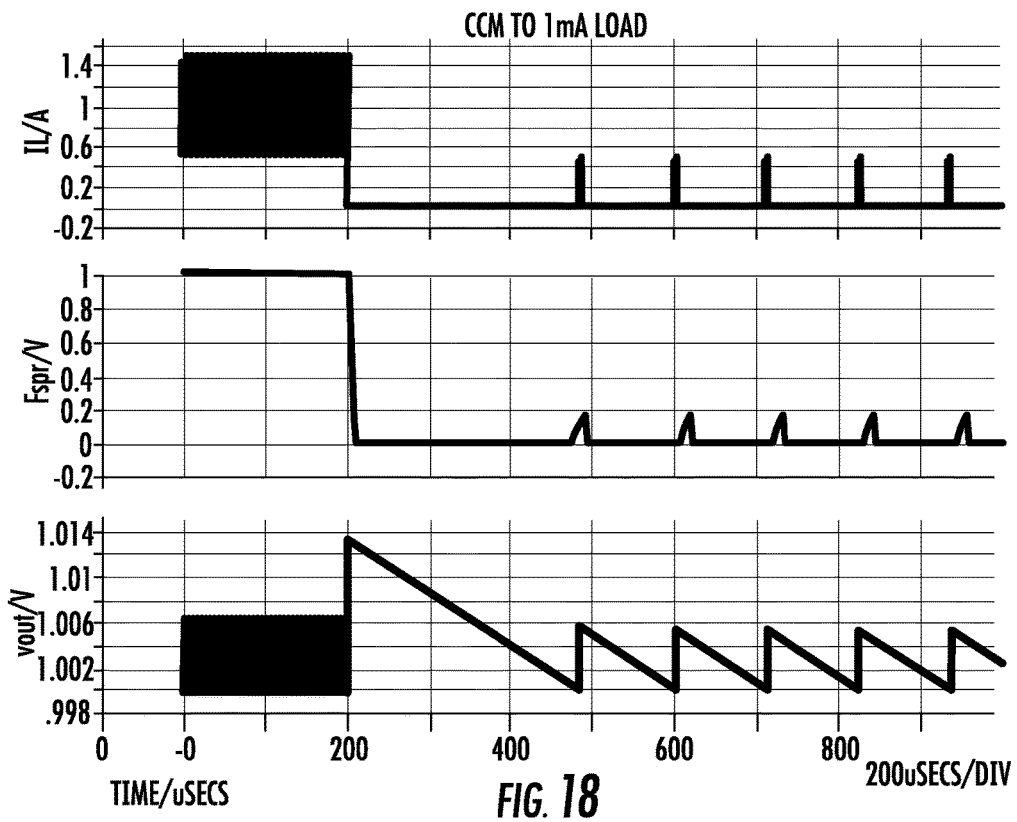
Figure 19:
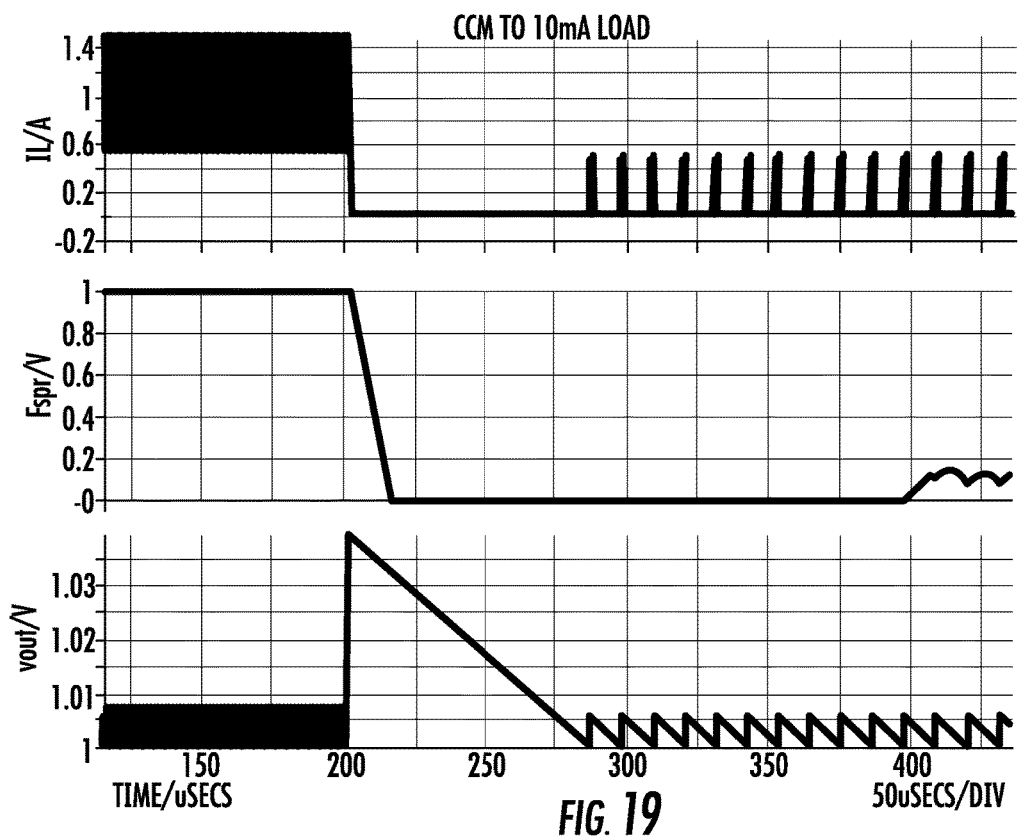
Figure 20:
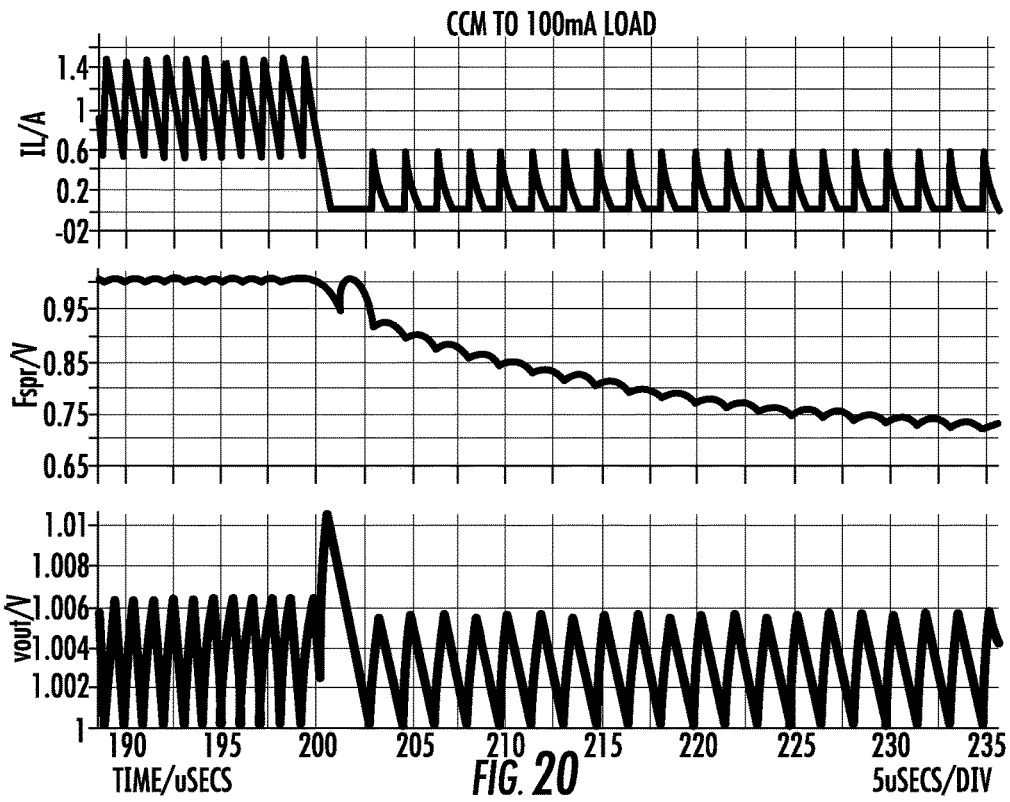

FIG. 16 is a schematic and block diagram of another embodiment of a system for adjusting $t_{on}$ in the buck converter of FIG. 1 according to the present invention wherein an exemplary filter preset as shown at 802 in FIG. 17 is included for presetting the system, if needed, when a large signal transient is detected.

FIGS. 17-20 are timing diagrams showing buck converter output voltage ripple values using the system of FIG. 12 according to the present invention that are generated as the output load current steps down from above the boundary between the continuous conduction mode and the discontinuous conduction mode to various exemplary lower value output load currents.

Figure 21:
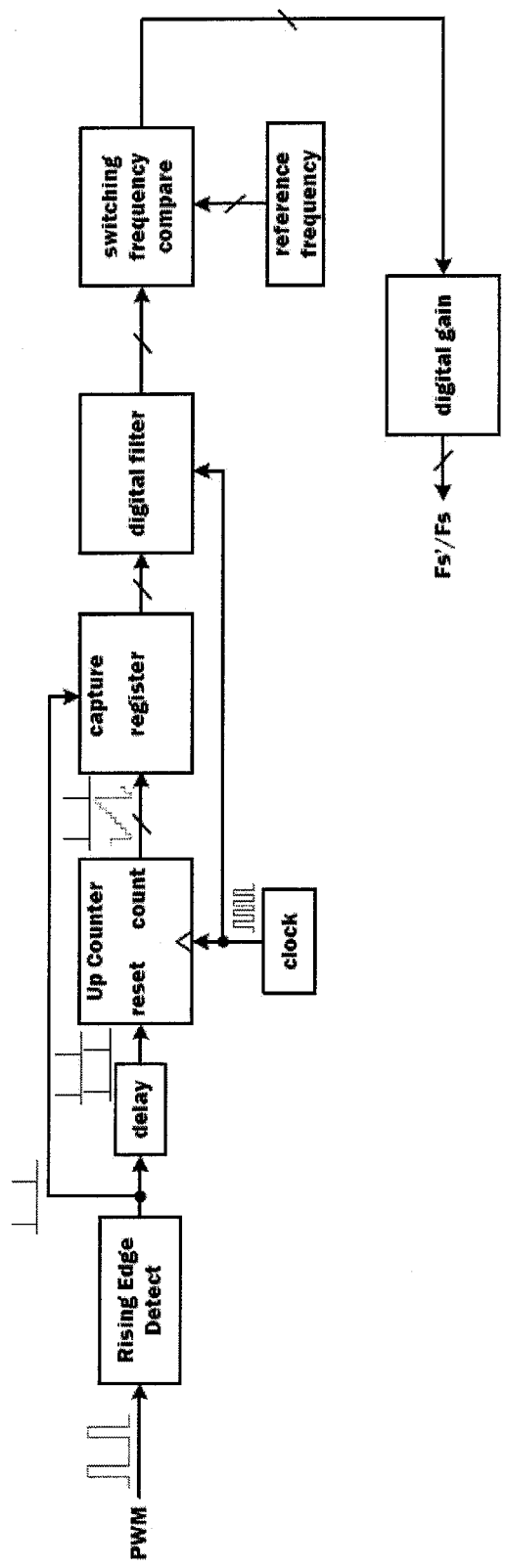
FIG. 21 is a block diagram of another embodiment of a system for adjusting $t_{on}$ in the buck converter of FIG. 1 according to the present invention implemented using digital components.

FIG. 21 is a block diagram of another embodiment of a system for generating the ratio Fs'/Fs to thereby adjust $t_{on}$ in the buck converter of FIG. 1 according to the present invention implemented using digital components.

The present invention has been described in relation to particular examples, which are intended in all respects to be illustrative rather than restrictive. Those skilled in the art will appreciate that many different combinations of circuits will be suitable for practicing the present invention. Moreover, other implementations of the invention will be apparent to those skilled in the art from consideration of the specification and practice of the invention disclosed herein. It is intended that the specification and examples therein be considered as exemplary only, with a true scope of the invention being indicated by the following claims.

What is claimed is:

1. A method for varying the on-time of a pulse width modulator (PWM) signal driving a buck converter when the buck converter is operating in discontinuous conduction mode, comprising:

measuring a switching frequency of the buck converter while it is operating in the discontinuous conduction mode and generating a Fs' value based on the measurement;

receiving a Fs value that is based on the switching frequency of the buck converter when it is operating in continuous conduction mode and the on-time of the PWM signal is constant;

generating an output signal that has a value that is substantially equal to the ratio of the Fs' value and the Fs value;

causing the on-time of said PWM signal to vary using the output signal; and causing said output signal to vary said Fs value so as to create a control loop that regulates said output signal.

2. The method of claim 1, wherein the PWM signal is caused to go on when a feedback signal that is a function of the output voltage of said buck converter drops below a reference signal, and wherein said output signal is modified by a gain stage and an offset stage, said modified output signal causing the PWM signal to go off after a duration of time that is a function of the ratio of the Fs' value and the Fs value.

3. The method of claim 2, wherein the on and off state of said PWM signal is controlled by a set-reset flip-flop which is caused to set when said feedback signal drops below said reference signal, and which is caused to reset as a function of the ratio of the Fs' value and the Fs value.

4. The method of claim 2, wherein said Fs' value is a voltage across a first capacitor, said Fs' value generating step comprising causing said first capacitor to discharge on the detection of the rising edge of each PWM signal; and causing the charge in said first capacitor to rise as a function of a current source coupled to said first capacitor; and wherein said Fs value is a constant voltage whose value is a function of the switching frequency of the buck converter when it is operating in continuous conduction mode; said step of causing said output signal to vary said Fs value comprising causing said current source to vary the charging time of said first capacitor as a function of said output signal.

5. The method of claim 1, further comprising low-pass filtering the generated Fs' value using a low pass filter the includes a capacitor having a voltage across it that is a function of the average voltage of said Fs' value, said method further comprising resetting said low-pass filter capacitor when the voltage across said capacitor exceeds a predetermined threshold.

6. The method of claim 1, wherein the PWM signal is caused to go on when a feedback signal that is a function of the output voltage of said buck converter drops below a reference signal, and wherein said output signal is modified by a gain stage and a second control loop, said second control loop comprising an offset stage, a multiplier and a low-pass filter; said modified output signal causing the PWM signal to go off after an amount of time that is a function of the ratio of the Fs' value and the Fs value.

7. The method of claim 1, further comprising varying the on-time of an oscillator signal as a function of said output signal, the oscillator signal causing the on-time of said PWM signal to vary.

8. A system for varying the on-time of pulse width modulator (PWM) signal driving a buck converter when said buck converter is operating in a discontinuous conduction mode, comprising:
  a measurement circuit for measuring a switching frequency of the buck converter while it is operating in the discontinuous conduction mode and generating a Fs' value based on the measurement;
  an input for receiving a Fs value that is based on the switching frequency of the buck converter when it is operating in continuous conduction mode;
  a comparator for generating an output signal that is a function of the ratio of the Fs' value and the Fs value, wherein the output signal is used to cause the on-time of the PWM signal to vary; and
  a feedback loop for regulating the output signal to.

9. The system of claim 8, further comprising an input comparator, a one-shot for generating said PWM signal and an on-time control block, said input comparator causing said one-shot to go on when said input comparator detects when the output voltage of said buck converter drops below a reference signal; and said on-time control block generating a modified output signal for causing said one-shot to reset as a function of the ratio of the Fs' value and the Fs value, and as a function of a gain stage and an offset stage, thereby causing the on-time of the PWM signal to vary.

10. The system of claim 9, wherein said one-shot comprises:
  a set-reset flip-flop;
  a switch;
  a capacitor;
  a current source; and
  a second comparator,
  and wherein said set-reset flip-flop is caused to change to a set state each time said input comparator detects when the output voltage of said buck converter drops below a reference signal, and wherein, when said flip-flop is in its set state, said switch is caused to open and enable a ramp voltage to be generated across said capacitor as a function of said current source, said comparator comparing said ramp voltage to said modified output signal, the output of said comparator resetting said flip-flop when the ramp voltage exceeds the modified output signal.

11. The system of claim 9, wherein said on-time control block includes an input and an output, said on-time control block further comprising a multiplier having two inputs and one output and a low-pass filter, the two inputs of said multiplier connected in common to the output of said on-time control block via said low pass filter, the output of said multiplier connected on the input side of said offset stage to create a control loop.

12. The system of claim 8 wherein said measurement circuit comprises:
  a first capacitor;
  a switch connected across said first capacitor; and
  a current source, and wherein said first capacitor is caused to discharge on the rising edge of each PWM signal, and wherein said current source causes a ramp voltage to be generated across said first capacitor, the output current of said current source also being a function of said output signal.

13. The system of claim 8, further comprising a low pass filter that includes a capacitor having a voltage across it that is a function of the average of said Fs' value, said system further comprising a reset circuit for resetting said low-pass filter capacitor when the voltage across said capacitor exceeds a predetermined threshold.

14. The system of claim 8, further comprising an oscillator for varying the on-time of said PWM signal as a function of said output signal.

* * * * *